E. D. OLIN.
Automatic Idle Wheel Supporting Device.
No. 215,154. Patented May 6, 1879.
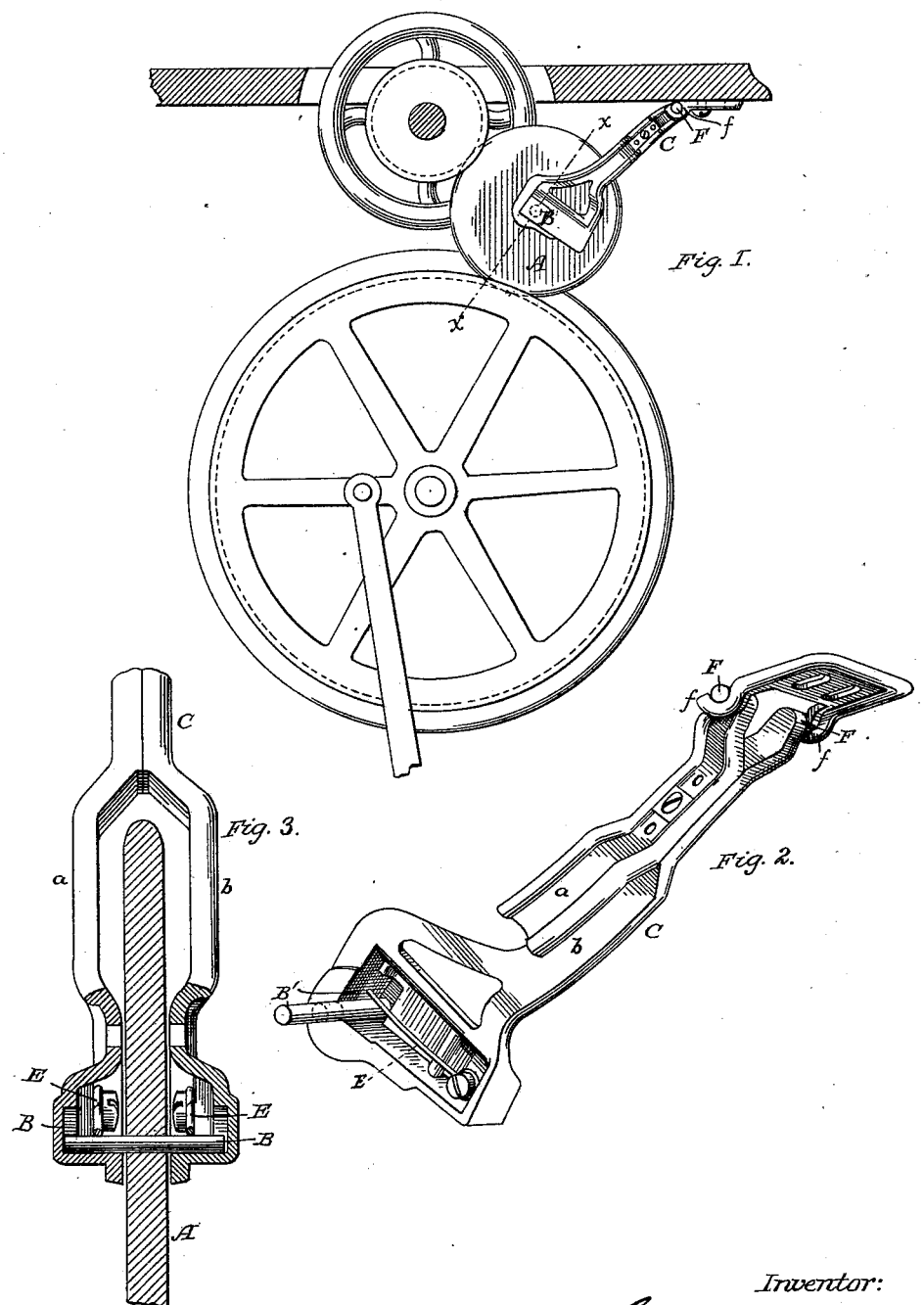

UNITED STATES PATENT OFFICE.

EDWIN D. OLIN, OF INDIANAPOLIS, INDIANA.

IMPROVEMENT IN AUTOMATIC IDLE-WHEEL-SUPPORTING DEVICES.

Specification forming part of Letters Patent No. 215,154, dated May 6, 1879; application filed March 18, 1879.

*To all whom it may concern:*

Be it known that I, EDWIN D. OLIN, of Indianapolis, in the State of Indiana, have invented a new and useful Improvement in Automatic Idle-Wheel-Supporting Devices, of which the following is a clear, full, and exact description, reference being had to the accompanying drawings, making a part of this specification, in which—

Figure 1 is a side elevation, showing my device. Fig. 2 represents the two parts of the hanging frame, a part of which is broken away to show its construction. Fig. 3 is a cross-section on the line $x\ x$ of Fig. 1.

To enable others skilled in the art to make and use my invention, I will proceed to describe the exact manner in which I have carried it out.

My invention relates to that class of idle-wheels designed to transmit motion from a driving to a driven wheel, and is applicable more particularly to the operating mechanism of sewing-machines; and it consists, first, in a yielding and self-adjusting journal-bearing and a hinged or swinging frame for holding the idle-wheel in contact with the driving-wheel; and, secondly, in the manner of journaling the wheel, as hereinafter described and claimed.

In the drawings, A represents the idle-wheel, running loose upon the journal B, having its bearings in the swinging frame C. This frame is composed of two sections, $a\ b$, as shown in Fig. 2, and secured together by screws or any well-known means, as shown in Fig. 1.

The bearings for the journal B are made sufficiently large, as shown at B', to give the journal considerable play and allow the idle-wheel to accommodate itself to the position of the other wheels, whether in the forward or reversed motion.

In each section of the swinging frame I place a spring, E, of any suitable construction, to bear against the ends of the journal B and keep them pressed toward the front of the frame. By this means the idle-wheel is kept in position and in contact with the driven wheel when the machine is not running, so that when the driving-wheel is started the idle-wheel acts immediately upon the driven wheel without the jumping motion which is common in idle-wheels as now constructed.

The spring E holds the idler snugly against the driven wheel and ready for its work, and when the machine starts the wheels all move smoothly into action, and the jumping motion is entirely avoided.

To secure a free and easy play to the idler, I journal it in a swinging frame, C, made of the pieces $a\ b$, suspended as shown in Fig. 1, or in any other convenient manner. I prefer using the form of trunnions F, turning in the bearings $f$, as by thus spreading these bearings greater steadiness is imparted to the frame, and the idler is held more exactly in the same vertical plane, which is an important consideration in the regular transmission of power or motion.

It is evident that the frame C may be hinged or swung in any manner most convenient without departing from the spirit of my invention, as I do not confine myself to any particular mode of hinging the frame.

I am aware of the patent to La Boiteaux, No. 132,671, and the suggestion or modification therein for hanging the transmitting-wheel in a swinging arm or rack, and hence I do not broadly claim such swinging frame; but Having thus explained my invention, what I claim as new, and desire to secure by Letters Patent, is—

1. A transmitting-pulley, A, kept in constant contact with the driving-wheel by gravity, in combination with a yielding self-adjusting bearing and sustaining frame, for the purpose set forth.

2. The frame C, constructed as described, and consisting of the sections $a$ and $b$, provided with the flared ends and trunnions F, in combination with the idle-wheel A, substantially as and for the purpose set forth.

3. The frame C, constructed as described, and consisting of the sections $a$ and $b$, provided with the enlarged bearings B' and spring E, in combination with the idle-wheel A, substantially as and for the purpose set forth.

EDWIN D. OLIN.

Witnesses:
L. C. ROYER,
W. F. MORSELL.